United States Patent [19]

Wilcox

[11] 4,301,664

[45] Nov. 24, 1981

[54] KEY BRACELET

[76] Inventor: Frederick Wilcox, 313 Pontiac Trail, Walled Lake, Mich. 48088

[21] Appl. No.: 124,730

[22] Filed: Feb. 26, 1980

[51] Int. Cl.[3] ........................ A44C 5/00; E05B 19/14; B29D 3/00

[52] U.S. Cl. ........................................... 63/1 R; 63/3; 70/401; 224/267

[58] Field of Search ...................... 63/1, 3, 11; 70/395, 70/401, 458; 224/267

[56] References Cited

U.S. PATENT DOCUMENTS 2,266,942 12/1941 Wallace ................................ 63/3 X
2,453,190 11/1948 Boscowitz ............................ 63/1 R
3,019,635 2/1962 Kling ................................ 63/1 R X

FOREIGN PATENT DOCUMENTS 655619 3/1965 Belgium ................................ 70/401

*Primary Examiner*—F. Barry Shay
*Attorney, Agent, or Firm*—James M. Deimen

[57] ABSTRACT

A claspless bracelet constructed of a malleable band with a key blank attached to at least one end of the band. Preferably the key blank or blanks are formed integral with or permanently affixed to the bracelet band. The bracelet is particularly directed to use by persons engaged in individual athletic activities such as jogging and swimming where it is not convenient to carry a conventional key ring.

3 Claims, 3 Drawing Figures

FIG. 1
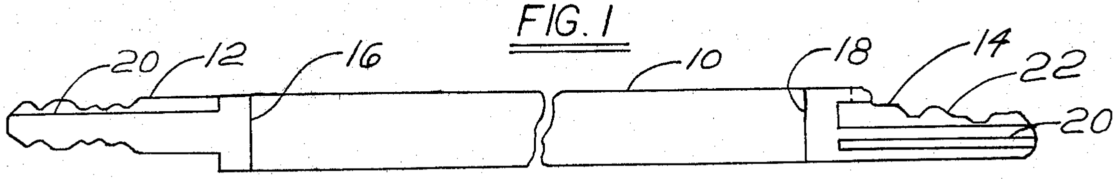
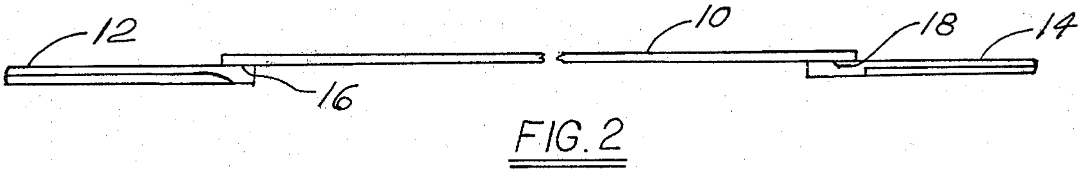
FIG. 2
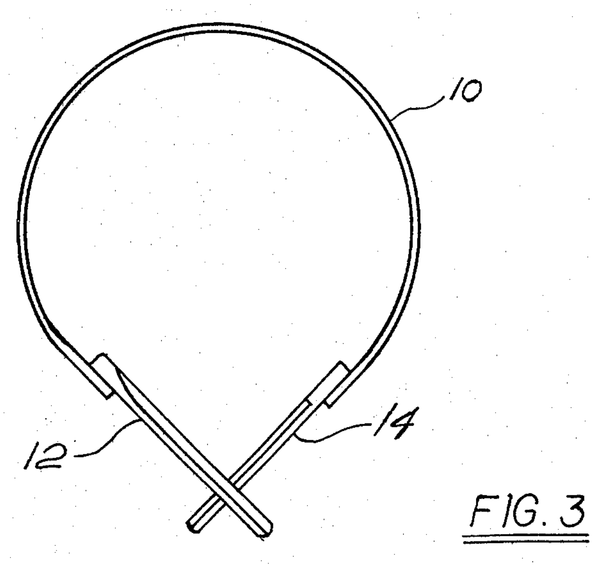
FIG. 3

KEY BRACELET

BACKGROUND OF THE INVENTION

Bracelets commonly are constructed with multiple loosely connected links to completely encircle the wrist or with a single solid piece to fully or substantially encircle the wrist. A clasp is usually used to connect the ends of a linked bracelet. Bracelets serve primarily as decorative items although sometimes including useful information such as identification or medical information. Some bracelets include attachments such as charms or a wrist watch. In the latter case the bracelet is usually termed a watch band.

Bracelets either loosely fit about the wrist or incorporate mechanical means to adjust the tightness about the wrist. Mechanical means may comprise merely a small buckle and tongue with leather straps or a plurality of spring loaded elements in a metal watch band.

Solid bracelets are constructed of rigid materials and not meant to be deformed or adjusted to the wrist size. Solid bracelets that do not completely encircle the wrist are constructed of a material that is substantially rigid with flexibility limited to that necessary for spring back when placed on or removed from the wrist.

SUMMARY OF THE INVENTION

The invention comprises a claspless bracelet band constructed of a soft malleable material and having key blanks at one or both ends of the band. Preferably the key blanks are formed integral with or permanently affixed to the bracelet band. The bracelet is particularly directed to use by persons engaged in individual athletic activities such as jogging and swimming where it is not convenient to carry a conventional key ring. The soft malleable band is bent about the wrist as tightly or loosely as desired by the wearer.

To remove, the band is merely bent open an amount sufficient to remove from the wearer's wrist. The bracelet can be tightened about the wrist an amount sufficient to prevent looseness that would distract the wearer as he jogs or swims and interfere thereby with the wearer's enjoyment of the sport. The soft malleable band permits repeated reuse and removal of the bracelet. Typically, the key blanks would be for automobile or household keys and cut to shape by a locksmith when the bracelet is purchased.

DESCRIPTION OF THE DRAWINGS

FIG. 1 is a plan view of the bracelet as manufactured and sold;

FIG. 2 is a side view of the bracelet as manufactured and sold; and,

FIG. 3 is a side view of the bracelet as worn.

DESCRIPTION OF THE PREFERRED EMBODIMENT

In FIGS. 1 and 2 the bracelet comprises a band 10 constructed of a soft malleable material such as soft copper of about 20 guage thickness. At each end of the bracelet key blanks 12 and 14 are attached. The key blanks are formed of a material sufficiently thick and rigid to serve as an automobile or household door key. In the preferred embodiment shown the key blanks 12 and 14 are brazed at 16 and 18 to the band 10. Alternatively, the key blanks may be formed integral with the band, the thickness of the blanks providing the rigidity necessary for keys in contrast to the softness of the substantially thinner band portion.

The bracelets are manufactured with key blanks having the necessary flutes 20 for the various types of keys in common use. When purchased, the wearer has a locksmith cut the pattern 22 desired into the blank. The wearer bends the bracelet into substantially the shape as shown in FIG. 3. The key blanks 12 and 14 will usually overlap as shown depending upon the wrist size of the wearer. Regardless of wrist size, the malleable band 10 can be bent as tightly as desired about the wrist.

When use of a key is desired, the malleable band 10 is unbent as necessary to remove from the wrist and separate the keys from the overlapping position shown in FIG. 3. Normally the band 10 will not need to be completely straightened to use the keys.

A soft copper band 10 can be bent and unbent easily by the wearer with his or her other hand. Soft copper can be bent and unbent a substantial number of times before work hardening causes the band to break. Other metals or plastics with similar soft malleable properties can be substituted for the copper. The key blanks can also be loosely fastened to the band, however, such a construction would tend to distract and possibly interfere with the wearer's enjoyment of the jogging, swimming or other sport.

I claim:

1. A bracelet comprising a soft malleable flat band and a key blank extending longitudinally from each end of the flat band as extended portions of the bracelet that overlap when the bracelet is wrapped about the wrist, each said key blank rigidly and permanently affixed to the flat band.

2. The bracelet of claim 1 wherein the key blank is integrally formed of the same material as the band but of a thickness sufficient to provide a relatively rigid key blank in comparison to the malleable band.

3. The bracelet of claim 1 wherein the flat band is constructed of soft malleable copper and the key blank is constructed of relatively rigid copper brazed to the soft copper band.

* * * * *